(12) United States Patent
Poisner et al.

(10) Patent No.: US 7,076,578 B2
(45) Date of Patent: Jul. 11, 2006

(54) RACE FREE DATA TRANSFER ALGORITHM USING HARDWARE BASED POLLING

(75) Inventors: David I. Poisner, Folsom, CA (US); Karthi R. Vadivelu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/186,056

(22) Filed: Dec. 22, 2003

(65) Prior Publication Data

US 2005/0138134 A1 Jun. 23, 2005

(51) Int. Cl.
*G06F 13/00* (2006.01)

(52) U.S. Cl. .............................. 710/52; 710/5; 710/22; 710/46; 711/170; 711/218

(58) Field of Classification Search .................... 710/5, 710/20, 22, 52–57, 46–48; 711/132, 170, 711/156, 217, 202, 213, 219, 220; 709/250; 370/412; 365/226
See application file for complete search history.

(56) References Cited

U.S. PATENT DOCUMENTS

| 3,812,475 | A | | 5/1974 | Christiansen et al. ..... 340/172.5 |
| 5,493,652 | A | * | 2/1996 | Koufopavlou et al. ....... 711/170 |
| 5,528,587 | A | * | 6/1996 | Galand et al. ............... 370/412 |
| 5,574,944 | A | * | 11/1996 | Stager ........................... 710/5 |
| 5,751,951 | A | * | 5/1998 | Osborne et al. ............ 709/250 |
| 6,279,051 | B1 | * | 8/2001 | Gates et al. ................... 710/20 |

OTHER PUBLICATIONS

AMD "PCnet Family Software Design Considerations" pp. 2-36.

* cited by examiner

*Primary Examiner*—Christopher Shin
(74) *Attorney, Agent, or Firm*—Blakely, Sokoloff, Taylor & Zafman LLP (57) ABSTRACT

A method and apparatus for a race free data transfer algorithm using hardware based polling. One disclosed method transfers information between a target device and a buffer which is one of a set of buffers. The buffer is pointed to by a current buffer value stored in a controller. The current buffer value is adjusted to point to a next buffer if the current buffer value is different than a last buffer value. One of the set of buffers is serviced utilizing either the current buffer value or the last buffer value from the controller.

18 Claims, 6 Drawing Sheets

RACE FREE DATA TRANSFER ALGORITHM USING HARDWARE BASED POLLING

BACKGROUND

1. Field of the Invention

The present invention pertains to the field of data transfers in a computer or other processing system.

2. Description of Related Art

An improved data transfer algorithm, such as an improved direct memory access (DMA) technique, may provide advantages both in terms of improved system performance and in terms of ease of interface software (e.g., device driver) design. Improved system performance may result from fewer bus transactions being used and from lengthening the total data transfer when additional data becomes available during the course of the data transfer. Simpler device drivers may be designed if the device driver software can easily obtain a precise and updated indication of the transfer status throughout the transfer.

A DMA transfer is a transfer of data (i.e., any stored information, instructions, etc.) between system memory and a device with limited or no intervention from the system processor once the transfer commences. A memory region that acts as the source or target of a DMA transfer is often physically contiguous. Alternatively, some DMA controllers may allow access to scattered memory regions (i.e., they support scatter-gather). In a DMA controller supporting scatter-gather, either multiple addresses may be programmed into the DMA controller or a data structure may be used to track the multiple regions of memory.

One advantage of using DMA-style transfers is that a large block of memory may be automatically transferred without further intervention of the processor. In other words, the controller can be initialized, and then can provide numerous bus cycles to transfer data without further intervention. The controller, however, typically only proceeds until reaching an endpoint programmed in during the initialization. Additionally, some controllers provide no mechanism to notify other components or software routines of progress throughout the transfer.

As a result, inefficient latencies may develop and the data transfer process may be prematurely halted. For example, consider a transfer of buffers from memory to a DMA device. If there is no notification until all data from memory is transferred to the DMA device, then the space in memory used by the data is not released until the entire transfer is complete. This delayed release inefficiently reserves memory despite the fact that its contents may no longer be needed after the data transfer is complete. Moreover, additional data may have been prepared and placed in memory during the DMA transfer. If the DMA controller was aware of this data, it could also be transferred without interruption and re-initialization of the DMA controller.

Some prior art DMA techniques, however, do allow updating a value indicating the last buffer to be transferred during the DMA transfer. A stop bit or count may be stored at some point in memory (e.g., a stop bit may be within the buffer structure). When additional buffers become available for transmission, the last stop bit may be updated by the software routine transferring the data into the additional buffers.

One problem with using a memory based stop bit is that the software routine(s) adding buffers to the list may experience a race condition with the DMA controller. Such software routines typically do not know exactly which buffer the DMA controller is working on at a particular point in time. Therefore, there is a risk that a memory stop bit will be turned off by software after the DMA controller has already read the buffer and retrieved the enabled stop bit.

To overcome this race condition, one prior art approach requires the DMA controller to poll the last buffer indicator in memory. Such continuous polling may disadvantageously use a large number of unnecessary bus cycles to read the pointer from memory. Additionally, such polling may still produce undesirable latencies. For example, if an additional buffer becomes ready for a transfer just after the DMA controller polls the value, the DMA controller will act on stale information until the next poll. As a result, the DMA controller may terminate a data transfer unnecessarily or at least experience a latency until the next polling event since it is unaware that the additional buffer is ready.

Thus, the prior art may not provide an adequate data transfer technique. Some prior art techniques may either not allow additional transfers to be added after controller initialization, may not allow efficient independent preparation and/or reclamation of buffers, or may inject undesirable extra latencies or bus cycles.

SUMMARY

A method and apparatus for a race free data transfer algorithm using hardware based polling is disclosed. One disclosed method transfers information between a target device and a buffer which is one of a set of buffers. The buffer is pointed to by a current buffer value stored in a controller. The current buffer value is adjusted to point to a next buffer if the current buffer value is different than a last buffer value. One of the set of buffers is serviced utilizing either the current buffer value or the last buffer value from the controller.

BRIEF DESCRIPTION OF THE FIGURES

The present invention is illustrated by way of example and not limitation in the figures of the accompanying drawings.

DETAILED DESCRIPTION

The following description provides a race free data transfer algorithm using hardware based polling. In the following description, numerous specific details such as register names, data structure configurations, specific system arrangements, and logic partitioning and integration choices are set forth in order to provide a more thorough understanding of the present invention. It will be appreciated, however, by one skilled in the art that the invention may be practiced without such specific details. In other instances, control structures and gate level circuits have not been shown in detail in order not to obscure the invention. Those of ordinary skill in the art, with the included descriptions, will be able to implement the necessary logic circuits without undue experimentation.

The presently disclosed techniques may be used to achieve an improved DMA architecture or to facilitate other similar types of data transfer transactions. A controller utilizing disclosed techniques may use a current buffer value and a last buffer value to allow the data transfer length to be changed after the transfer has been initiated without causing a race condition to occur. In some embodiments, the presently disclosed techniques may reduce the number of overhead bus cycles required to maintain a flexible length transfer and/or may allow the use of simpler device driver software for interfacing with the controller. Additionally, a prefetch register may be used to facilitate more efficient accesses when a data structure used in the data transfer is stored in main memory.

Figure 1:
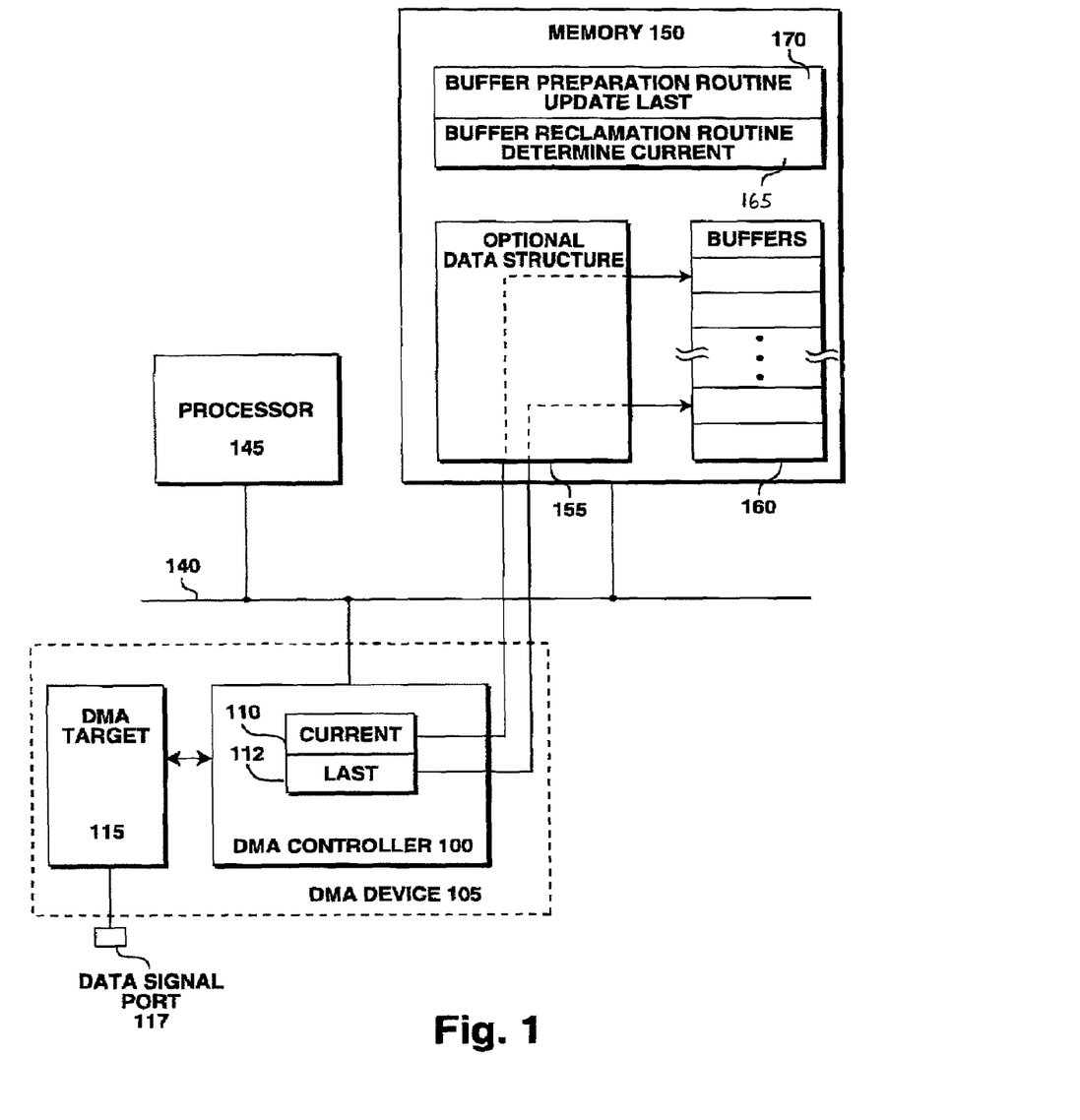
FIG. 1 illustrates one embodiment of a system utilizing disclosed data transfer techniques.

FIG. 1 illustrates one embodiment of a system using hardware based polling to maintain a race free DMA process. In FIG. 1, a processor 145, a memory 150, and a DMA device 105 are coupled to a bus 140. More elaborate system architectures may be employed; however, the presently disclosed techniques are not limited to any particular system or set of device arrangements since data transfers may be implemented in a wide variety of ways. In fact, any system supporting a data transfer controller that may store values (e.g., in registers) which point to memory locations and are accessible to software routines initiating, controlling, or otherwise servicing the data transfer may be used for some embodiments.

In the embodiment shown in FIG. 1, the DMA device 105 includes a DMA controller 100 and a DMA target 115. These components may be separate components or may be integrated together and/or with other components. The DMA target 115 has a data signal port 117. The DMA target 115 may send and/or receive either digital or analog signals via the port 117. Thus, the DMA device 105 may be almost any device which exchanges data with memory utilizing DMA or other similar transfers. Some examples are audio coder-decoders, modems, network interfaces, or other communication or signal exchange interfaces.

The DMA controller includes a current buffer register 110 and a last buffer register 112. Either a register as a dedicated storage location or a register as a particular entry in a general purpose storage area may be used. The current buffer register 110 and the last buffer register 112 may be implemented in a variety of manners so long as the values contained therein indicate or identify the proper buffer locations when needed. These registers allow the DMA controller 100 to track which one of a set of buffers 160 stored in the memory 150 is presently being transferred as well as the buffer at which the DMA controller 100 should stop (the last buffer).

For example, the registers may simply contain pointers to buffers in memory if a linked list type structure is used for the buffers. Alternatively, the registers may store either direct or indexed pointers into an optional data structure 155 stored in memory. If the optional data structure 155 is used, the registers may point to buffer descriptors residing in a buffer descriptor table in the memory 150. In any case, the values stored in the current buffer register 110 and the last buffer register 112 adequately indicate or identify particular buffers to the DMA controller 100 and any software routines that utilize this information.

The memory 150 also contains software routines. A buffer preparation routine 170 prepares buffers for a DMA transfer. If DMA data is being received by the memory 150 from the DMA target 115, then the buffer preparation routine 170 may assure that an empty buffer is ready to receive the data. If data is being transferred from the memory 150 to the DMA target 115, then the buffer preparation routine 170 may fill the buffer with data to be transferred.

A buffer reclamation routine 165 recaptures one or more buffers after the DMA transfer(s) affecting the buffer(s) complete. If DMA data is being received by the memory 150 from the DMA target 115, then the reclamation routine may pass the data on to the software process that requested the data and then may free the buffer. If data is being transferred from the memory 150 to the DMA target 115, then the information stored in the buffer is typically no longer needed, and the reclamation routine can mark the buffer as free. If additional DMA transfers complete before the reclamation routine 165 exits, the reclamation routine may continue to reclaim buffers.

Figure 2:
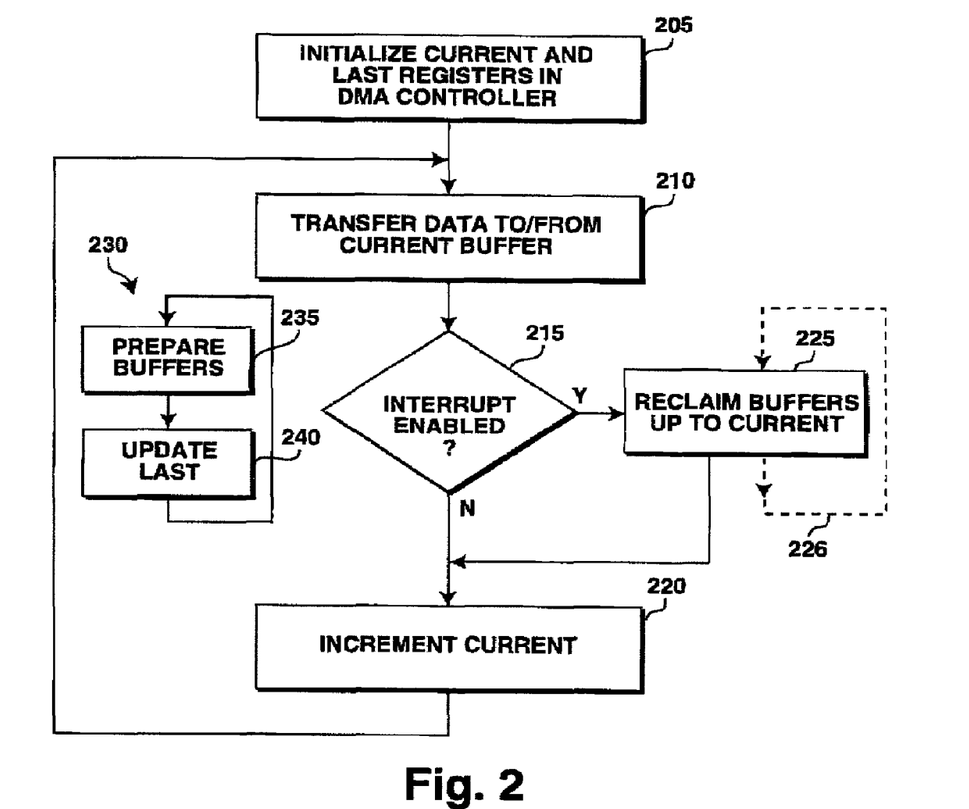
FIG. 2 illustrates a flow diagram for operations of one embodiment of the system of FIG. 1.

The flow diagram of FIG. 2 further illustrates operation of one embodiment of the system in FIG. 1. In block 205, the current buffer register 110 and last buffer register 112 are initialized. In block 210, data is then transferred to or from the buffer indicated by the current buffer register 110.

After the transfer, an interrupt bit associated with the transferred buffer is tested in step 215. If the interrupt bit is set, then buffers are reclaimed as shown in block 225 via the buffer reclamation routine 165 (FIG. 1). Any processed buffer up to but excluding the current buffer may be reclaimed. If the buffer was a receiving buffer, the data may be transferred out and the buffer freed. If the buffer was a source buffer, the buffer may simply be marked free if the data is no longer needed.

Notably, utilizing an interrupt associated with each buffer is optional. As indicated by the dotted line 226, the reclamation routine could be an independent process which is periodically activated or which continuously frees processed buffers. In any case, the reclamation routine may be able to quickly free used buffers without waiting for the end of the entire DMA transfer because it can access the current buffer register 112 in the DMA controller and therefore determine which buffers are still needed.

In block 220, since processing of the current buffer has completed, the current buffer register 110 is incremented. Once again, the process returns to transferring data to or from the current buffer as shown in block 210. Accordingly, a series of buffers may be transferred using DMA-style data transfer techniques and the associated processed buffers may be freed for other uses.

Additionally, however, the length of the transfer may be increased by the buffer preparation routine 170 acting as a separate process 230 while the transfer is in progress. As shown in block 235, the buffer preparation routine 170 prepares buffers for transfer. This may involve designating a free buffer to receive data or filling a buffer with data to be transferred. The buffer preparation routine then updates the last buffer register 112 as shown in block 240.

Consequently, the DMA controller 100 maintains an internal and updated indication of the last buffer which is available for DMA transfer. When the DMA controller 100 decides whether to continue a DMA transfer sequence, it has current information regarding buffer availability. There may be no long latency as typically occurs if the DMA controller periodically polls the memory. Thus, the efficiency of the total DMA transfer may be enhanced since a longer DMA transfer may be achieved. Furthermore, since the DMA controller 100 need not periodically poll the main memory 150 to determine the status of the buffers 160, the bus traffic from the DMA controller 100 may be reduced. This may advantageously allow increased other uses of the bus. Thus, a system employing the disclosed techniques may achieve more efficient performance than prior art systems.

Figure 3:
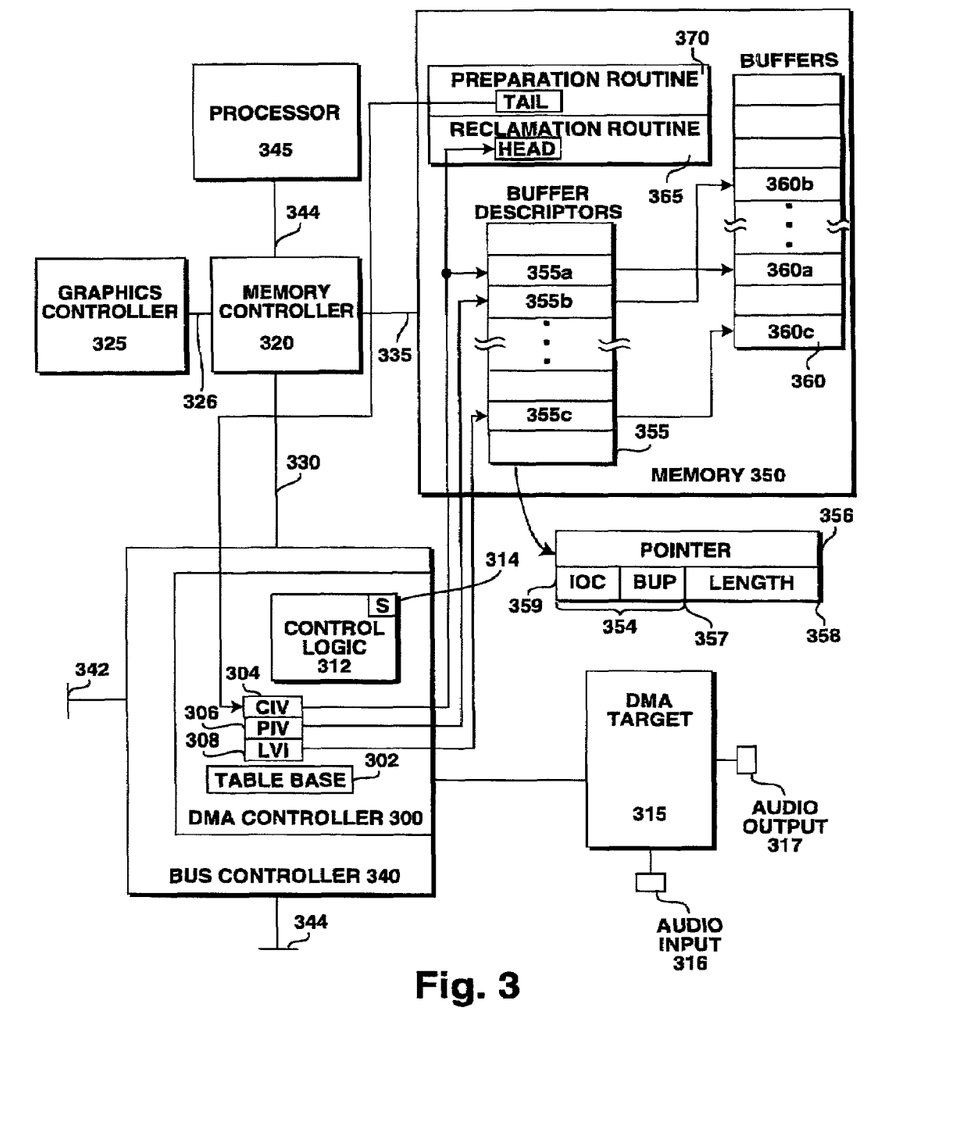
FIG. 3 illustrates one embodiment of a system utilizing a buffer descriptor table.
Figure 4:
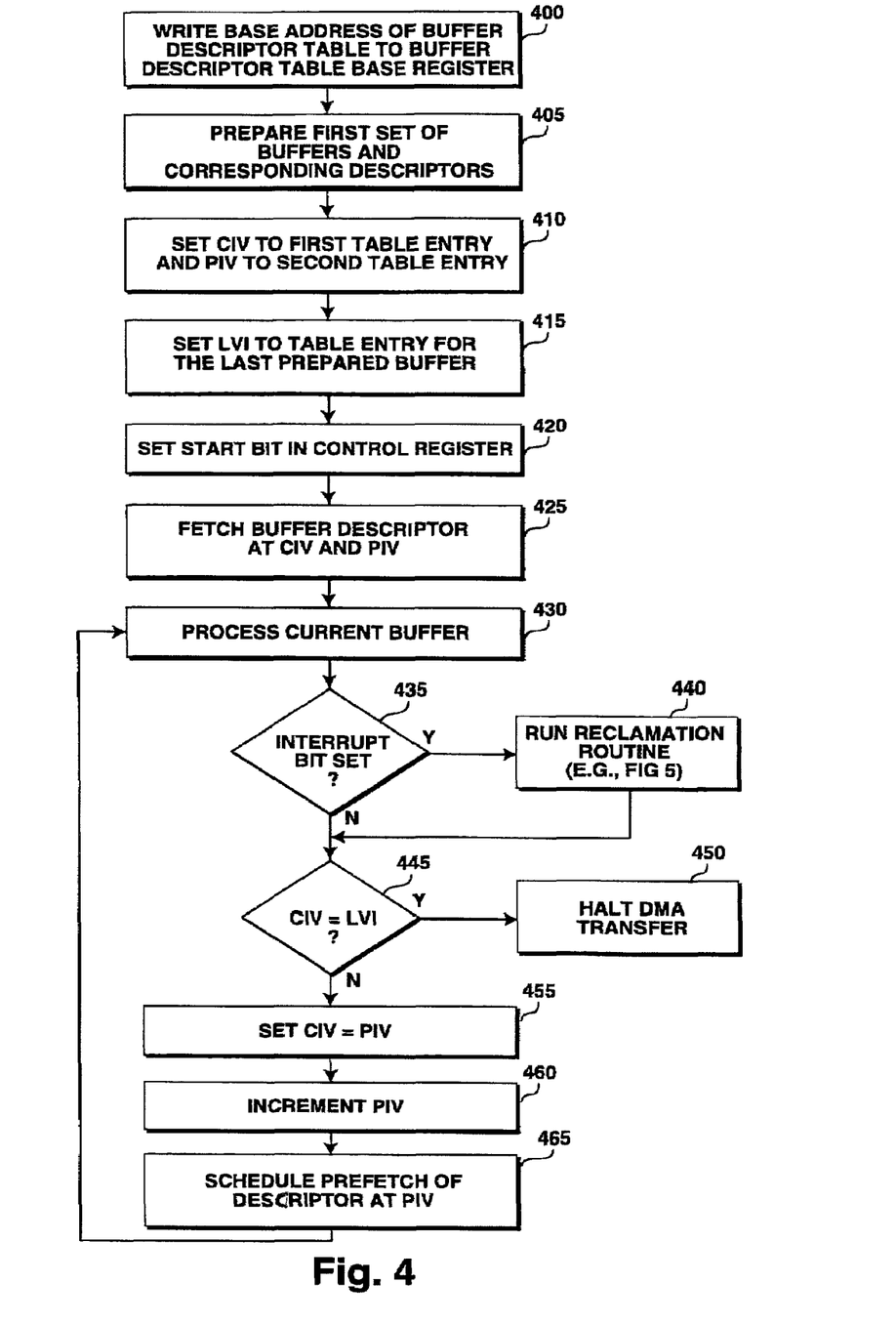
FIG. 4 illustrates a flow diagram for one embodiment of the system of FIG. 3.
Figure 5:
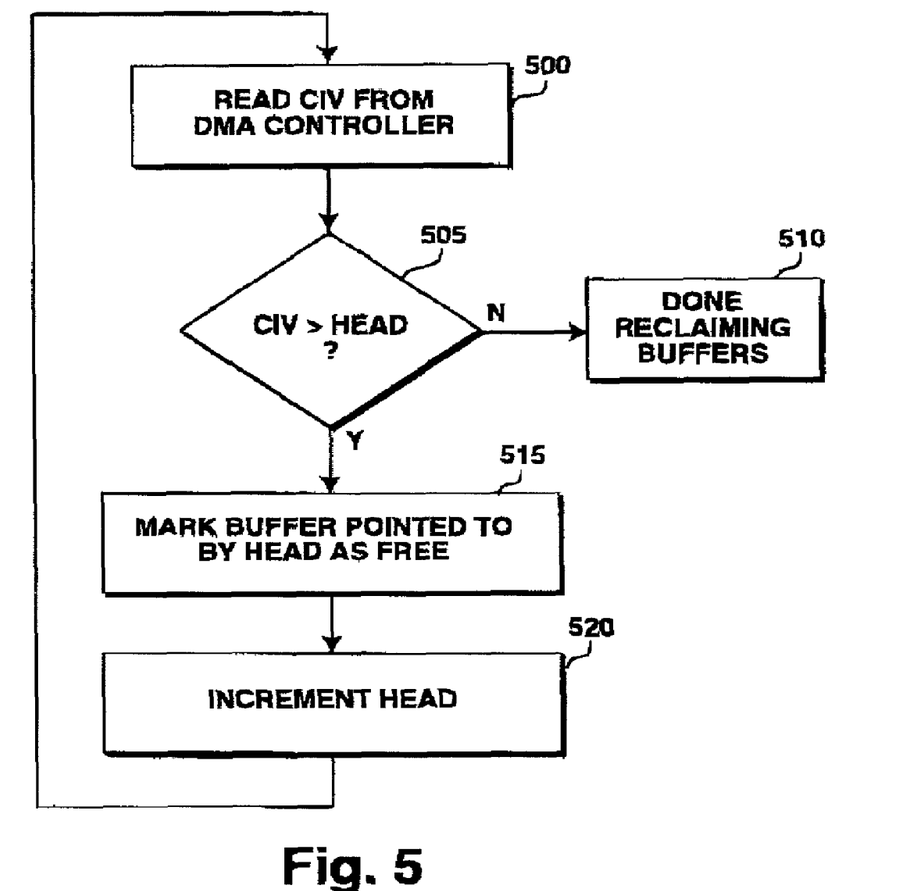
FIG. 5 illustrates a flow diagram for one embodiment of a buffer reclamation routine.
Figure 6:
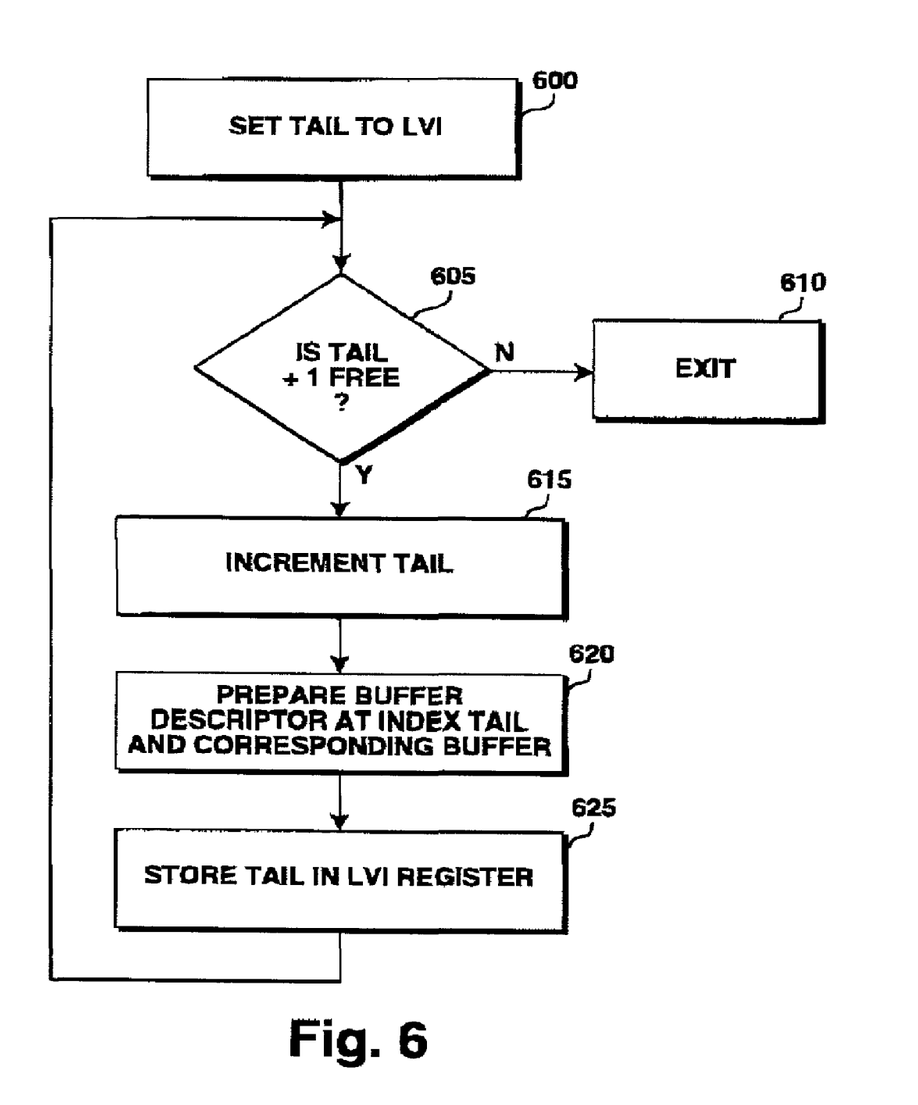
FIG. 6 illustrates a flow diagram for one embodiment of a buffer preparation routine.

FIG. 3 illustrates another embodiment of a system utilizing DMA controller based buffer tracking. Additionally, FIGS. 4–6 are flow diagrams illustrating operation of one embodiment of the system in FIG. 3. Similarly to the system in FIG. 1, the system in FIG. 3 includes a processor 345, a memory 350, a DMA controller 300, and a DMA target 315. The DMA target 315 may be an audio coder-decoder (CODEC) such as a CODEC compliant with the AC '97 Specification, Revision 1.01, Sep. 10, 1998, published by Intel corporation of Santa Clara, Calif. The AC '97 specification was publicly available at the time of filing of this application on the Internet at http://www.intel.com/pc-supp/platform/ac97.

As illustrated, the DMA controller 300 may be integrated into a bus controller 340 which also interfaces with two other buses 342 and 344 (e.g., a peripheral components interconnect bus and a low pin count bus). The system of FIG. 3 also includes a memory controller 320 which is coupled to the processor 345 by a bus 344, to the memory 350 by a bus 335, to the bus controller 340 by a bus 330, and to a graphics controller 325 by a bus 326.

The embodiment shown in FIG. 3 has a buffer descriptor table 355 in the memory 350 and utilizes index values and a buffer descriptor table base register 302 in the DMA controller 300 to reference buffer descriptors. In turn, each buffer descriptor references one of a set of buffers 360 in the memory 350. An enlarged view of one of the buffer descriptors is shown below the memory 350. The buffer descriptor may include a pointer 356 which points to the memory location of the buffer. The descriptor may also include a length field 358 and a command field 354 with an interrupt on complete (IOC) field 359 and a buffer underrun policy (BUP) field 357.

The IOC field 359 may be used to indicate to the DMA controller 300 whether or not it should signal an interrupt upon completion of each transfer. The BUP field 357 may indicate what the DMA controller should do if there is insufficient data to keep passing on to the DMA target 315. For example, if the DMA target 315 generates an audible audio signal, it may be desirable to continue transmitting the last value to avoid an abrupt and undesirable change in the audio. If the DMA target 315 is transmitting data, it may be preferable to interpolate, zero out, or otherwise effectuate and underrun policy depending on the type of data being transmitted.

Referring now to the flow diagram of FIG. 4, the operation of one embodiment of the system in FIG. 3 is shown. In block 400, the base address of the buffer descriptor table 355 is written to the buffer descriptor table base register 302. This operation sets a reference point for the index values which will be stored in registers in the DMA controller 300. In block 405, the first set of buffers are prepared for DMA transfer prior to enabling the DMA controller 300.

After these buffers are prepared for DMA transfer, a current index value (CIV) and prefetch index value (PIV) are stored respectively in a CIV register 304 and a PIV register 306 in the DMA controller 300 as illustrated in block 410. The buffer descriptor table 355 in the memory 350 is implemented as a circular buffer with N entries. Accordingly, the DMA control logic 312 may count modulo N using the index values to implement the circular buffer structure. The index value is added to the value stored in the buffer descriptor table base register 302 to obtain the address in memory of the desired buffer descriptor.

Accordingly, the CIV register 304 points to a buffer descriptor 355a which in turn points to a buffer 360a. The PIV register 306 points to a buffer descriptor 355b (subsequent to 355a) which in turn points to a buffer 360b. Since buffer descriptors are used, the memory locations buffers 360a and 360b need not bear any particular relation to each other. The embodiment illustrated in the flow diagrams counts up from zero to N−1; however, decrementing or other appropriate counting techniques could also be used, with comparisons and offsets also being appropriately reversed where necessary.

In step 415, a last valid index (LVI) value is stored in a LVI register 308 in the DMA controller 300. The last valid index value indicates the index (the offset into the buffer descriptor table 355 from the buffer descriptor base address stored in the table base register 302) of the last valid descriptor 355c. The last descriptor 355c points to a buffer 360c that is the last one prepared for a DMA transfer. Once the last valid index value is stored in the LVI register 308, the DMA controller 300 may be enabled.

In block 420, a start bit 314, which may be a bit in a control register, is set in the DMA controller 300. When the DMA controller 300 is first starting, both the buffer descriptor indicated by the current index value and the prefetch index value are fetched as indicated in block 425. During continuous operation, the DMA controller will already have the current buffer descriptor and will only need to prefetch the next buffer descriptor. Notably, prefetching is not required; however, when a multiple-tier data structure such as a table using buffer descriptors is used, prefetching may increase efficiency significantly.

In step 430, the buffer indicated by the current buffer pointer (the CIV) is processed. That is, the already fetched buffer descriptor is examined and the pointer to the buffer in memory is extracted as well as the length. The control logic 312 of the DMA controller 300 performs the appropriate number of read or write cycles based on the length of the buffer found in the buffer descriptor. When the transfer cycles are complete, the control logic 312 may take actions in accordance with the command field 354 of the buffer descriptor.

For example, if the interrupt bit or field (IOC 359) is set or enabled, as tested in block 435, the DMA controller signals an interrupt as which may cause a reclamation routine 365 to be executed as indicated in block 440. If the IOC field 359 is not set/enabled, the control logic 312 proceeds to compare the current index value to the last valid index. If the current buffer is the last buffer available, as tested in block 445, then the controller halts the DMA transfer as indicated in block 450.

If, however, the current index value is not equal to the last valid index, then there are additional blocks to be transferred and the control logic 312 proceeds to block 455 where the current index value is set to the prefetch index value. Since the descriptor for the prefetch index value has already been prefetched, the DMA controller 300 already has the memory address of the appropriate buffer and can continue data transfer. Additionally, the prefetch index value is adjusted (e.g., in this embodiment incremented) to point to the next buffer descriptor as indicated in block 460, and a prefetch of the descriptor at the new prefetch index value is scheduled as indicated in block 465.

Thereafter, the controller returns to block 430 where the (new) current buffer is processed. This process is repeated until the DMA transfer is halted (block 450) due to the exhaustion of the buffer supply (the current index value equaling the last valid index) or until another event interrupts the DMA transfer.

FIG. 5 illustrates one embodiment of the reclamation routine 365. The reclamation routine may be executed in response to an interrupt generated at the end of a buffer (IOC bit set), or the reclamation routine may be implemented as a separate process which repeats periodically or which runs continuously. The reclamation routine maintains a head pointer (HEAD) to the last buffer that was freed. The reclamation routine or other software initially establishes the head pointer after at least one buffer is designated for transfer.

In block 500, the current index value is read from the DMA controller 300. If the current index value is not greater than the head pointer, as tested in block 505, then there are no buffers which have been processed and have not been reclaimed (marked as free for re-use). Therefore, the reclamation routine 365 is finished reclaiming buffers as indicated in block 510. In other embodiments that use a different counting or buffer tracking technique, different comparisons may be used throughout to determine the relationship between the head pointer and the current index value.

If the current index value is less than the head pointer, the reclamation routine 365 marks the buffer pointed to by the head pointer as free as indicated in block 515. Thus, the buffer is released relatively quickly for use by other processes or for reuse in the DMA transfer since the entire DMA transfer need not be completed before the buffer is released. As indicated in block 520, the head pointer is adjusted to point to a next potentially reclaimable buffer (e.g., in this embodiment incremented) and the process returns to reading the current index value from the DMA controller 300.

Since the reclamation process does not happen instantaneously, the current index value may have advanced, allowing additional buffers to be reclaimed. Additional interrupts which may have occurred due to the completion of the processing of other buffers may be ignored since this embodiment of the reclamation routine continues looping and re-loading the current index value until all processed buffers have been reclaimed. This aspect may be particularly advantageous where the DMA controller uses non-reentrant interrupts that may have otherwise been lost to signal the end of each buffer.

FIG. 6 illustrates one embodiment of a preparation routine 370. The preparation routine 370 alters the current index value to extend the DMA transfer and include additional buffers that became available after the DMA transfer was initiated. As indicated in block 600, the tail pointer (TAIL) is set to the current index value. If the next buffer (TAIL+1) is not free, as tested in block 605, the routine exits in block 610. Either a lack of available buffers, data, or buffer descriptors may prevent the preparation of additional buffers. If those resources needed are available, the tail pointer is incremented in block 615.

Next, a buffer and buffer descriptor are prepared as indicated in block 620. A free buffer may be selected if the DMA transfer is scheduled to read data into memory. A buffer may be filled with data if the DMA transfer is scheduled to transfer data from memory. The memory address of the buffer may be written to the pointer field 356 of the buffer descriptor and the length and special commands may be indicated in appropriate fields as well. Notably, this or other known or otherwise available buffer preparation techniques appropriate for DMA transfers may be used.

After the buffer and buffer descriptor are prepared, the incremented tail pointer is stored in the last valid index register 308. As a result, as soon as the buffer is prepared, the DMA controller 300 may receive current information regarding the last available buffer. In some embodiments, no extraneous bus traffic is required because the software routine updates a value stored in the DMA controller 300 when data for an additional buffer is available for DMA transfer.

Thus, a race free data transfer algorithm using hardware based polling is disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A method comprising:
   transferring information between a target device and a first buffer which is one of a plurality of buffers, the first buffer being pointed to by a current buffer value stored in a controller;
   adjusting the current buffer value stored in the controller to point to a next buffer if the current buffer value is different than a last buffer value stored in the controller;
   servicing one of the plurality of buffers utilizing one of the current buffer value and the last buffer value from the controller, wherein the current buffer value is a first index into a buffer descriptor table and wherein the current buffer value points to the first buffer by pointing to a buffer descriptor offset by the first index from a buffer descriptor table base location; and
   prefetching a next buffer descriptor from the buffer descriptor table.

2. The method of claim 1 wherein servicing comprises:
   retrieving the current buffer value from the controller;
   comparing the current buffer value to a head pointer of a buffer list;
   marking a buffer pointed to by the head pointer as being processed if the head pointer has not reached the current buffer value; and
   adjusting the head pointer to point to a next potentially reclaimable buffer if the head pointer has not reached the current buffer value.

3. The method of claim 1 wherein servicing comprises:
   preparing a buffer pointed to by an incremented tail pointer; and
   storing the incremented tail pointer as the last buffer value in the controller.

4. The method of claim 1 further comprising:
   testing an interrupt field to determine whether the interrupt field is set to a first value to interrupt upon completion of processing the first buffer; and
   generating an interrupt if the interrupt field is set to the first value.

5. The method of claim 1 further comprising:
   executing a buffer underrun routine according to a command field associated with the first buffer if there are no further buffers available for transfer.

6. A bus agent comprising:
   a current buffer register for storing a first value indicating a first memory location for a current buffer, wherein the current buffer resister contains a first index value and wherein the first index value in the current buffer register indicates the first memory location by pointing to a first buffer descriptor in a buffer descriptor table, the first buffer descriptor being the first index value locations from a buffer descriptor table base;

a last buffer register for storing a second value indicating a second memory location for a last buffer ready for processing, wherein the last buffer register contains a second index value and wherein the second index value in the last buffer register indicates the second memory location by pointing to a second buffer descriptor in the buffer descriptor table, the second buffer descriptor being the second index value locations from the buffer descriptor table base;

control logic coupled to transfer data to or from the current buffer and to update the current buffer register to point to a next buffer unless the first value from the current buffer register is equivalent to the second value from the last buffer register; and a prefetch buffer register, wherein the control logic is coupled to set the current buffer register equal to a value in the prefetch buffer register, to increment the value in the prefetch buffer register, and to schedule a prefetch of a buffer descriptor pointed to by the prefetch buffer register.

7. The bus agent of claim 6 wherein the current buffer register contains a first pointer to a linked list of buffers in memory and wherein the last buffer register contains a second pointer to a last buffer in the linked list of buffers in memory.

8. A system comprising:
   a bus controller comprising:
      a current buffer register for storing a first value indicating a memory location of a current buffer;
      a last buffer register for storing a second value indicating a memory location of a last buffer, the last buffer being the last buffer which is prepared for processing; and
      control logic coupled to transfer data to or from the current buffer and to update the current buffer register to point to a next buffer unless the first value is equivalent to the second value;
   a processor; and
   a memory coupled to the processor, the memory containing:
      a plurality of buffers including the current buffer and the last buffer;
      at least one software routine which, if executed, causes the system to service at least one of the plurality of buffers utilizing information stored in one of the current buffer register and the last buffer register.

9. The system of claim 8 wherein the memory further contains:
   a buffer descriptor table having a plurality of buffer descriptors pointing to the plurality of buffers, and
   wherein the current buffer register contains a first index value, the first index value in the current buffer register indicating the current buffer by pointing to a first buffer descriptor in the buffer descriptor table, the first buffer descriptor being the first index value locations from a buffer descriptor table base.

10. The system of claim 9 wherein the last buffer register contains a second index value, the second index value in the last buffer register indicating the last buffer by pointing to a second buffer descriptor in the buffer descriptor table, the second buffer descriptor being the second index value locations from the buffer descriptor table base.

11. The system of claim 8 wherein the current buffer register contains a first pointer to a linked list of buffers in memory and wherein the last buffer register contains a second pointer to a last buffer in the linked list of buffers in memory.

12. The system of claim 8 wherein the bus controller further comprises a prefetch buffer register and wherein the control logic is further coupled to set the current buffer register equal to a value stored in the prefetch buffer register, to increment the prefetch buffer register, and to schedule a prefetch of a prefetch buffer descriptor pointed to by the prefetch buffer register.

13. The system of claim 8 wherein the at least one software routine comprises:
   a preparation routine which, if executed, causes the system to perform:
      preparing a buffer pointed to by an incremented tail pointer; and
      storing the incremented tail pointer in last buffer register.

14. The system of claim 8 wherein the at least one software routine comprises:
   a reclamation routine which, if executed, causes the system to perform:
      retrieving a current buffer value from the current buffer register;
      comparing the current buffer value to a head pointer of a buffer list;
      marking a buffer pointed to by the head pointer as being processed if the head pointer has not reached the current buffer value; and
      adjusting the head pointer to point to a next potentially reclaimable buffer if the head pointer has not reached the current buffer value.

15. A system comprising:
   a processor;
   a bus agent comprising:
      a current index register;
      a prefetch index register; and
      a last index register;
      a buffer descriptor base address register;
      control logic coupled to transfer data to or from a buffer pointed to by the current index register, to stop retrieving data if the current index register and the last index register contain equivalent values, to set the current index register equal to the prefetch index register, to increment the prefetch index register, and to schedule a prefetch of a prefetch buffer descriptor pointed to by values stored in the prefetch index register and the buffer descriptor base address register.
   a memory coupled to the processor and the bus agent containing:
      a table storing a plurality of buffer descriptors
      a preparation routine which, if executed, causes the system to perform:
         checking an incremented tail index to determine whether the incremented tail index points to a free buffer;
         if the incremented tail index points to the free buffer, then
            preparing the free buffer by storing data to be retrieved by the bus master into the free buffer;
            storing the incremented tail index in the last index register;
      a reclamation routine which, if executed, causes the system to perform:
         retrieving a current index value from the current index register;

comparing the current index value to a head pointer;
if the head pointer is less than the current index value, then
marking a buffer pointed to by the head pointer as free;
incrementing the head pointer;
returning to comparing the current index value to the head pointer.

16. An article comprising a machine readable medium having stored thereon a plurality of instructions which, if executed by the machine, cause the machine to perform:

transferring information between a direct memory access (DMA) controller and a first buffer which is one of a plurality of buffers, the first buffer being pointed to by a current buffer register in the DMA controller;

adjusting the current buffer register to point to a next buffer if the current buffer register contains a different value than a last buffer register;

servicing one of the plurality of buffers utilizing information contained in one of the current buffer register and the last buffer register, wherein a value in the current buffer register is a first index into a buffer descriptor table and wherein the value in the current buffer register points to the first buffer by pointing to a buffer descriptor offset by the first index from a buffer descriptor table base location; and prefetching a next buffer descriptor from the buffer descriptor table.

17. The article of claim 16 wherein the servicing performed by the machine further comprises:

retrieving a first value from the current buffer register;

comparing the first value to a head pointer of a buffer list;

marking the buffer pointed to by the head pointer as being processed if the head pointer has not reached the first value; and adjusting the head pointer to point to a next potentially reclaimable buffer if the head pointer has not reached the first value.

18. The article of claim 16 wherein the servicing performed by the machine further comprises:

preparing a buffer pointed to by an incremented tail pointer; and storing the incremented tail pointer in last buffer register.

\* \* \* \* \*